United States Patent
Sagaser

(10) Patent No.: US 6,604,762 B2
(45) Date of Patent: Aug. 12, 2003

(54) HYDRAULIC FITTING

(75) Inventor: Thomas M. Sagaser, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 10/017,267

(22) Filed: Dec. 14, 2001

(65) Prior Publication Data

US 2002/0195819 A1 Dec. 26, 2002

Related U.S. Application Data

(60) Provisional application No. 60/300,164, filed on Jun. 22, 2001.

(51) Int. Cl.[7] ................................................. F16L 19/00
(52) U.S. Cl. ........................................ 285/353; 285/386
(58) Field of Search ................................ 285/386, 384, 285/240, 353

(56) References Cited

U.S. PATENT DOCUMENTS

| | | | |
|---|---|---|---|
| 1,326,970 A | 1/1920 | Row et al. | |
| 1,977,241 A | 10/1934 | Parker | 285/86 |
| 2,090,266 A | 8/1937 | Parker | 285/86 |
| 2,123,999 A | 7/1938 | Lauer | 285/86 |
| 2,251,716 A * | 8/1941 | Parker | 285/354 |
| 2,381,829 A * | 8/1945 | Livers | 285/332.3 |
| 2,444,622 A | 7/1948 | Wolfram | 285/122 |
| 2,453,813 A * | 11/1948 | Prince | 285/332.3 |
| 2,496,510 A | 2/1950 | Wolfram | 285/86 |
| 3,116,944 A * | 1/1964 | Parker | 285/354 |
| 3,160,426 A * | 12/1964 | Faeser | 285/95 |
| 3,195,936 A * | 7/1965 | Conder | 285/354 |
| 3,265,413 A | 8/1966 | Currie | 285/334.4 |
| 3,273,917 A | 9/1966 | Chakroff | 285/263 |
| 3,273,918 A | 9/1966 | Legarra et al. | 285/332.3 |
| 4,076,280 A * | 2/1978 | Young | 285/386 |
| 5,002,316 A | 3/1991 | Chohan | 285/110 |
| 5,340,163 A * | 8/1994 | Merrer et al. | 285/354 |
| 5,472,244 A * | 12/1995 | Nishikata et al. | 285/354 |
| 5,903,964 A * | 5/1999 | Uematsu et al. | 285/386 |
| 6,007,112 A * | 12/1999 | Kim | 285/386 |
| 6,022,053 A * | 2/2000 | Hukuda | 285/354 |
| 6,109,660 A * | 8/2000 | Akiyama et al. | 285/353 |

* cited by examiner

*Primary Examiner*—Eric K. Nicholson
*Assistant Examiner*—James M. Hewitt
(74) *Attorney, Agent, or Firm*—Westman, Champlin & Kelly, P.A.

(57) ABSTRACT

A hydraulic coupling that is used for connecting hydraulic tubular lines includes a male plug which will mate with a standard tube end flare. The male plug has a rounded end that will provide for a line contact with the interior surface of the standard flare. The rounded end of the plug is joined to the main portion of the male plug body through a wall that is controlled in cross-sectional size so that the outer end will deflect as the male plug is tightened into place. This will provide a resilient loading along a line of contact to insure that the seal is maintained even if there is slight axial movement between the flare and the male plug.

4 Claims, 2 Drawing Sheets

HYDRAULIC FITTING

The present application is based on and claims the benefit of priority from U.S. provisional patent application Serial No. 60/300,164, filed Jun. 22, 2001, the content of which is hereby incorporated by reference in its entirety.

BACKGROUND OF THE INVENTION

The present invention relates to a hydraulic fitting for connecting to a tube flare which has a tubular male plug that engages a flared surface with a radiused or rounded edge to form a line contact seal. The wall at the end of the male plug is of a cross section adjacent the rounded edge so the wall will resiliently deflect as the fitting is tightened to keep a load on the seal line during use to insure a tight seal.

In the prior art, threaded hydraulic couplers have been used for a long time. These include couplers with an internally threaded cap that surrounds a flared seat formed on a tube for carrying the hydraulic fluid, and a male plug which has external threads so the cap threads onto the male plug and as the parts are tightened the end of the male plug is forced onto the seat. The plug has an end edge that engages the seat for sealing. In many instances, the ends of the plug and the seats are manufactured to the same angle, so that they seat across a fairly large surface area that is used for providing the hydraulic seal for hydraulic fluid under pressure being carried through the line or interior passageway.

Leaks are a problem, and there is a need for a tight, leak free fitting that is easily connected without an excessive amount of threading pressure or coupling pressure, and which will maintain the seal for a long period of time.

SUMMARY OF THE INVENTION

The present invention relates to a threaded hydraulic coupling, which includes a male plug that is captured with a threaded female cap that surrounds a flared seat on a tube and which is formed to provide a positive, enduring seal. The tube flare is formed at a selected included angle from the central axis of the tube passageway. The cap is threaded onto the male plug. The male plug has an end edge portion that has a radiused outer surface, so that a line contact is made and maintained between the end of the plug and the flared seat surface. A line contact insures a leak-free, easily made seal.

The tubular wall at the end of the plug is controlled in cross-sectional size between the rounded end edge and the main body of the plug. The rounded edge will deflect inwardly as the fitting is tightened, to provide a resilient loading of the end edge of the plug that contacts the seat. As use occurs, there will be a load maintained on the sealing edge due to the resilient deflection between the end of the plug and the seat.

Two forms of the invention are shown. In one form the end portion is tapered to provide a reduced cross section for deflection. In a second form, an internal groove is provided to reduce the wall plug thickness so the end edge will resiliently deflect. The coupling is easily made, using standard manufacturing procedures, and by providing a line contact between the mating parts, it is insured that a tight seal is made. With the controlled cross section support wall to provide resilient loading of the seal, the seal is maintained for long periods of time.

DETAILED DESCRIPTION OF THE ILLUSTRATIVE EMBODIMENTS

Figure 1:
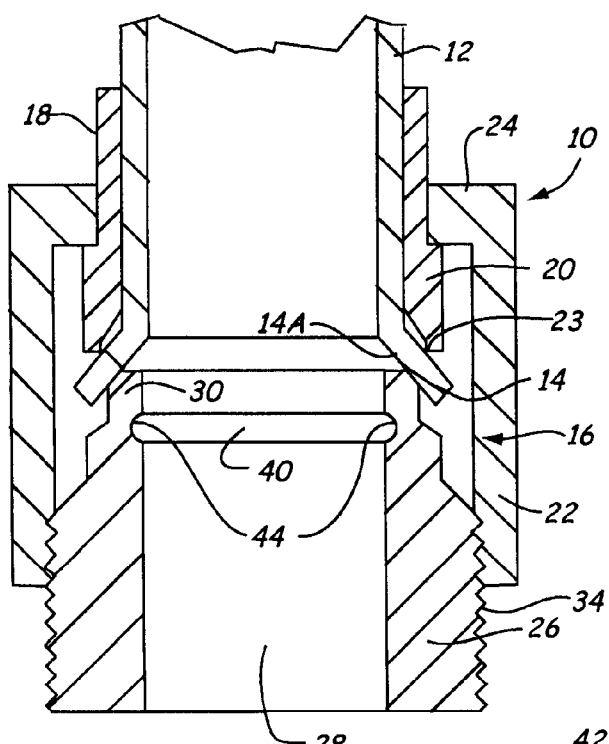
FIG. 1 is a cross-sectional view of a hydraulic coupling flare fitting made according to the present invention.
Figure 2:
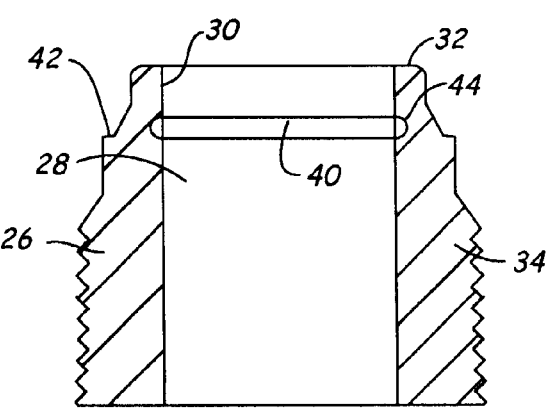
FIG. 2 is a cross-sectional view of a male plug used in FIG. 1.

A hydraulic fitting of connector 10 uses a standard flare on the hydraulic tube line used widely in the industry. The hydraulic line 12 has a standard 37° flared end 14 having a sealing surface 14A.

A compression nut and sleeve assembly 16 surrounds the tube and includes a backing sleeve 18 that slides over the tube 12 and has an end collar 20 with an end edge 23 that makes a backing support for the exterior of flare 14.

The sleeve 18 is surrounded by a nut 22 that has interior threads and an inwardly turned flange 24 that bears on the collar 20 of sleeve 18.

Figure 3:
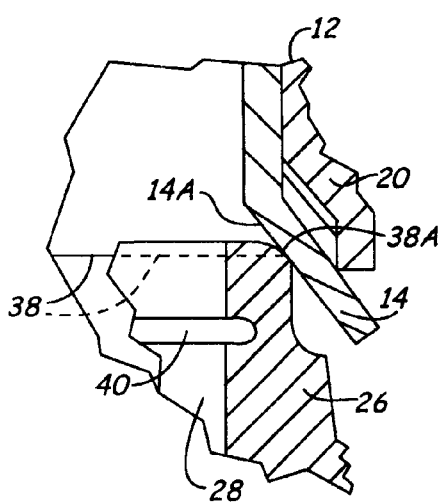
FIG. 3 is an enlarged cross-sectional view showing a rounded end of the male plug.

A male connector or fitting plug 26 has an interior bore 28 that carries hydraulic fluid under pressure and has an end 30 that engages the surface 14A. The exterior edge 32 of the end 30 is formed as a radius that makes line contact with surface 14A as the nut threads tighten on the exterior threads 34 of the plug. There is therefor line contact with the surface 14A. The contact line can be a very high unit force generated by the threaded coupling at the interface line indicated at 38 in FIG. 3. The line 38 is at the tangent contact line indicated at 38A between the surface 14A and the rounded edge 32.

A groove 40 is provided at the neck 42 of fitting 26 so the end 30 will deflect downwardly as shown in FIG. 1, as the joint is tightened. The cap 22 is threaded onto the threads 34 for coupling and the end 30 deflects under a spring load forming an axial force.

The axial force is generated by deflection at a reduced cross section junction wall 44 at the ends of the groove 40. The junction wall 44 is an annular wall and creates a predetermined amount of force that will keep the joint sealing line 38 tight.

The male plug or fitting of the present invention will fit onto existing flares having the standard 37° angle flare. Other angles of flare will achieve the same line contact where the radiused end engages the conical flare.

Referring to FIG. 1 the fitting shown is a direct replacement for a standard 37° flare fitting used in the industry today. The standard 37° flare end is replaced by the radius nose shown at 32.

The radius nose at 32 is an improvement over the standard 37° flare in that when the 37° flare tube end is clamped to the nose 32, there is a very high unit force on the line contact interface. This high unit force will create a metal to metal line contact, that will prevent oil from leaking by the joint.

The relieved area at 40 provides a controlled amount of deflection when the joint is tightened. The axial force as shown will create a predetermined amount of deflection in the assembled joint and this deflection will keep the joint tight. Existing 37° flare technology will not do this.

Figure 4:
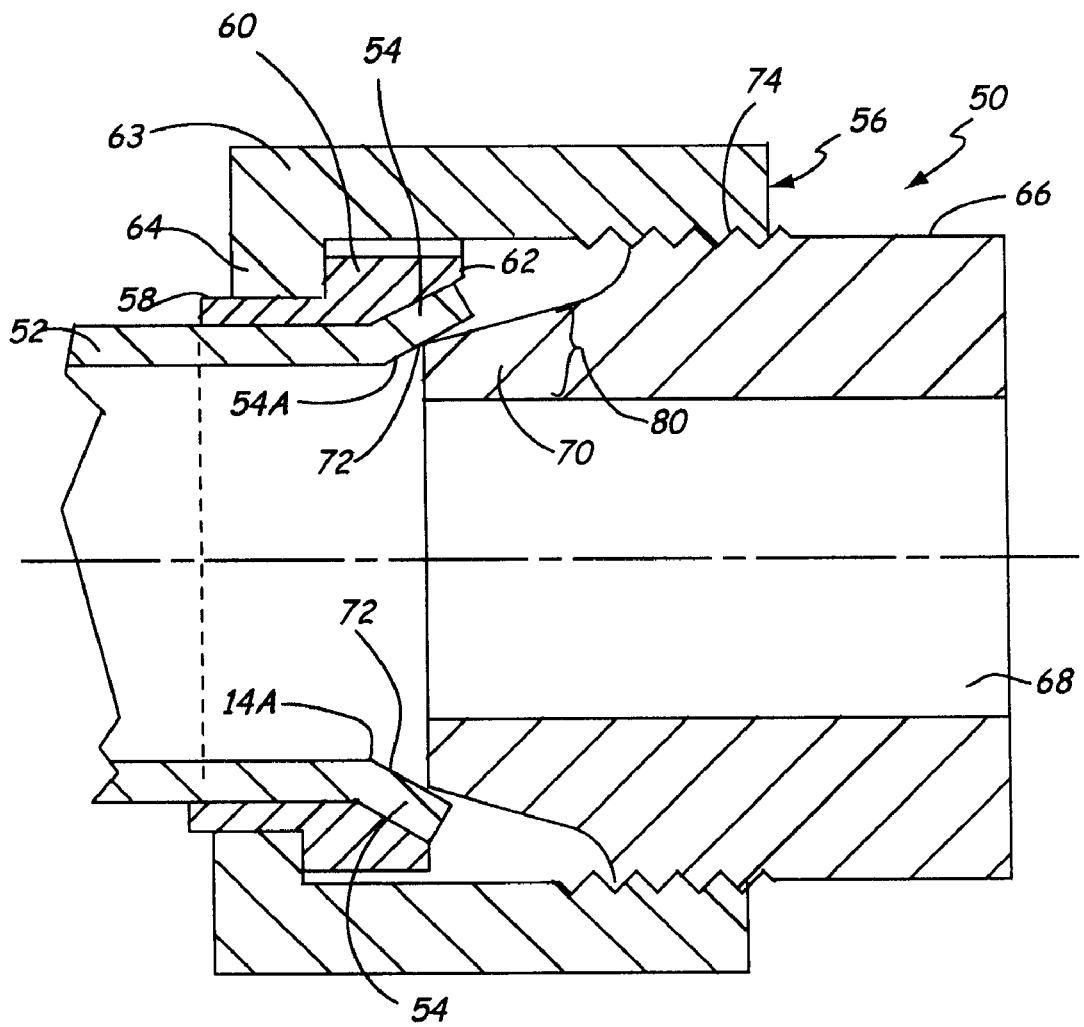
FIG. 4 is a cross-sectional view of a further embodiment of the invention.

In FIG. 4, a modified form of the invention is indicated at 50. A hydraulic line 52 that has a 37° flared end 54 with an internal sealing surface 54A. A compression nut and sleeve assembly 56 is mounted over the line or tube 52 and includes a backing sleeve 58 that has an end collar 60 that has an outer end edge 62 that bears against the exterior surface of the tube flare 54.

Sleeve 58 is surrounded by a nut 63 that has interior (female) threads and an inwardly turned flange 64 that bears against the collar 60 of the sleeve 58. A male connector or plug 66 has an interior bore 68 that carries hydraulic fluid under pressure and has a tubular end portion 70 that engages the surface 54A. The exterior end edge 72 of the end portion 70 is formed as a radius that makes line contact with the interior surface 54A of the flare as nut 63 tightens on the exterior threads 74 of the plug 66. This line contact with the surface 14A made by the end edge radius 72 can have a very high force per unit, with the axial load applied by threading the threaded coupling parts together.

In this form of the invention, the tubular end portion 70 has a controlled annular cross-sectional size indicated at the region 80 that permits the out end of the portion 70 deflection inwardly as the nut 63 is tightened onto the plug 66. The controlled cross-sectional size is made so that the nut end portion 70 will deflect inwardly, and then provide a controlled force along the line contact between the rounded end surface 72 and the surface 14A, if the coupling loosens slightly.

Thus, instead of having a groove that provides a reduced cross-sectional area, the cross-sectional area shown at 80 is controlled as part of a tapered annular wall to be the correct size for obtaining deflection when the nut is tightened down, and this, coupled with the line contact with the surface 14A ensures that the joint will remain tight.

Although the present invention has been described with reference to preferred embodiments, workers skilled in the art will recognize that changes may be made in form and detail without departing from the spirit and scope of the invention.

What is claimed is:

1. A conduit coupling assembly, including a first coupling member having a substantially frustoconical concave annular surface, and a second coupling member having an end portion that fits within the frustoconical concave annular surface, the second coupling member being a generally tubular body having a bore along it longitudinal axis that mates with a bore in the first coupling member, the end portion of the second coupling member having an outer side, and a radiused surface forming a rounded end edge along the outer side said radiused surface contacting the frustoconical concave surface along a line of contact that provides a fluid seal, and the second coupling member having an annular groove formed in an interior of the bore to provide a reduced cross-sectional area wall joining the rounded end edge surface to a body portion of the second coupling member, the reduced cross-sectional area wall being of size to permit deflection of the rounded end edge surface when the second coupling member is joined to the first coupling member using a threadable nut for urging the first and second coupling members axially together.

2. The conduit coupling assembly of claim 1, wherein the rounded end edge surface is joined to the body portion of the second coupling ember through a controlled, tapered cross-sectional area wall comprising the reduced cross-sectional area wall, the tapered cross-sectional area wall tapering from a smaller wall thickness at the rounded end edge to a greater wall thickness adjacent the body portion.

3. A conduit coupling assembly, comprising a first generally tubular coupling element having a first bore extending along a central longitudinal axis, and having a flared outer end forming a generally conical concave surface relative to the central axis, a second coupling element comprising a male coupling member having a second bore, a nose portion and a body portion, the nose portion having an annular outer end edge at an outer end thereof that is rounded, and an annular groove formed in the second bore and forming a reduced cross-sectional tubular wall portion joining the outer end edge to the body portion of the second coupling element, a coupling nut for threadably engaging the second coupling element and urging the second coupling element toward the first coupling element when the coupling nut is threaded for fastening the coupling nut being threadable with sufficient force in a direction along the central axis to deflect the nose portion at the reduced cross-sectional area tubular wall so that the tubular wall deflects as the nose portion is urged against the conical concave surface with a controlled force that maintains a seal along a line of contact between the conical concave surface of first coupling element and the nose portion of the second coupling element which tolerates small axial movements of the coupling element.

4. The conduit coupling assembly of claim 3, and a backing member surrounding the first coupling element and engaging an exterior surface of the flared portion to provide a support for the flared portion to prevent substantial outward deflection of the flared portion.

\* \* \* \* \*

UNITED STATES PATENT AND TRADEMARK OFFICE
CERTIFICATE OF CORRECTION

PATENT NO.    : 6,604,762 B2                                    Page 1 of 1
DATED         : August 12, 2003
INVENTOR(S)   : Thomas M. Sagaser It is certified that error appears in the above-identified patent and that said Letters Patent is hereby corrected as shown below:

<u>Column 3,</u>
Line 14, insert -- and reduced -- after "controlled".
Line 23, insert -- reduced -- after "the insert".

<u>Column 4,</u>
Line 11, change "ember" to -- member --.
Line 30, insert -- , -- after "fastening".

Signed and Sealed this

Eleventh Day of November, 2003

JAMES E. ROGAN
*Director of the United States Patent and Trademark Office*